United States Patent
Freitag et al.

(10) Patent No.: US 10,353,600 B2
(45) Date of Patent: Jul. 16, 2019

(54) TAPE LIBRARY INITIATED MEDIA VERIFICATION

(71) Applicant: International Business Machines Corporation, Armonk, NY (US)

(72) Inventors: Bernd Freitag, Partenheim (DE); Frank Krick, Ockenheim (DE); Tim Oswald, Gimbsheim (DE); Harald Seipp, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 15/274,202

(22) Filed: Sep. 23, 2016

(65) Prior Publication Data

US 2018/0088836 A1   Mar. 29, 2018

(51) Int. Cl.
  *G06F 3/06*   (2006.01)
  *G06F 11/00*   (2006.01)

(52) U.S. Cl.
  CPC .......... *G06F 3/0619* (2013.01); *G06F 3/0653* (2013.01); *G06F 3/0686* (2013.01); *G06F 11/004* (2013.01)

(58) Field of Classification Search
  CPC ....................................................... G06F 3/06
  USPC .................................. 711/100, 111, 113, 154
  See application file for complete search history.

(56) References Cited

U.S. PATENT DOCUMENTS

| | | | | |
|---|---|---|---|---|
| 5,594,922 A | * | 1/1997 | Suzuki | G06F 3/0601 710/107 |
| 6,446,160 B1 | | 9/2002 | Le et al. | |
| 7,072,869 B2 | * | 7/2006 | Guthery | G06F 21/335 705/59 |
| 7,133,984 B1 | | 11/2006 | Dickensheets | |
| 7,864,478 B2 | | 1/2011 | Anna et al. | |
| 8,339,721 B2 | | 12/2012 | Thompson | |
| 8,527,561 B1 | | 9/2013 | Moody, II et al. | |
| 8,559,124 B2 | * | 10/2013 | Fry | G11B 15/18 360/31 |
| 8,631,281 B1 | * | 1/2014 | Stripling | G11B 27/36 714/42 |
| 8,843,787 B1 | | 9/2014 | Foster et al. | |
| 8,849,784 B2 | | 9/2014 | Alber et al. | |
| 9,063,542 B2 | * | 6/2015 | Greco | G11B 15/689 |
| 9,250,811 B1 | * | 2/2016 | Patiejunas | G06F 3/061 |
| 9,317,358 B2 | * | 4/2016 | Foster | G06F 11/08 |
| 9,612,912 B2 | * | 4/2017 | Wertheimer | G06F 11/1451 |

(Continued)

OTHER PUBLICATIONS

Oracle®, "Automated Data Integrity Validation with Oracle Hierarchical Storage Manager 6.0", Oracle Brief, © 2015, pp. 1-5.

(Continued)

*Primary Examiner* — Tuan V Thai
(74) *Attorney, Agent, or Firm* — Richard A. Wilhelm

(57) ABSTRACT

A method for verification of content of tape cartridges in a tape library system using tape drives of the tape library, is provided. The method includes instructing the tape drive to perform tape cartridge verification on the tape cartridge. The method further includes after completion of the tape cartridge verification, unloading the tape cartridge to its original storage position. The method further includes transmitting verification data of the tape cartridge verification to a database of the tape library system for analysis.

14 Claims, 5 Drawing Sheets

(56) References Cited

U.S. PATENT DOCUMENTS

2010/0265606 A1* 10/2010 Thompson ............... G11B 5/86
                                                    360/15
2012/0117040 A1   5/2012 Hostetter et al.
2014/0359369 A1  12/2014 Foster et al.
2015/0117174 A1   4/2015 Alber et al.

OTHER PUBLICATIONS

Spectra Logic, "Spectra Logic Drives New Era for Data Integrity", Mar. 21, 2011, www.spectralogic.com /2011/03/21/spectra-logic-drives-new-era-for-data-integrity/, pp. 1-2.

Mell et al., The NIST Definition of Cloud Computing, Recommendations of the National Institute of Standards and Technology. Special Publication 800-145, Sep. 2011, 7 pages.

IBM: List of IBM Patents or Patent Applications Treated As Related (Appendix P), Jan. 9, 2018, pp. 1-2.

Pending U.S. Appl. No. 15/840,454, filed Dec. 13, 2017, entitled: "Tape Library Initiated Media Verification", pp. 1-26.

\* cited by examiner

TAPE LIBRARY INITIATED MEDIA VERIFICATION

BACKGROUND

The present invention relates generally to the field of computers, and more particularly to tape library initiation of media verification in data centers.

A data center is a facility used to house computer systems and associated components, such as telecommunications and storage systems. It generally includes redundant or backup power supplies, redundant data communications connections, environmental controls, e.g., air conditioning, fire suppression, and various security devices. Large data centers are industrial scale operations. To ensure a failure less operation within a data Center the status of used components needs to be monitored and proactive replacement of failing components is required, especially within the Cloud Environment. For instance, in the cloud environment, cloud service providers typically guarantee customers that all data stored is protected against data loss causes by hardware or media defense. Since magnetic tape cartridges are getting more and more used by cloud services provides as low cost data storage devices, verification of data integrity is typically required. After a complete media scan the quality of a Media Tape Cartridge can be determined based on the amount of Read/Write Failures, Read/Write Retries, Error Recovery Codes, Realigned Data Blocks, Read and Write speed. For doing this, the content of the complete Tape Library must be revalidated periodically.

SUMMARY

According to one embodiment, a method for verification of content of tape cartridges in a tape library system is provided. The method includes in response to expiration of the verification period of a tape cartridge, loading the tape cartridge in a tape drive of the tape cartridge, wherein the tape drive is a verification tape drive. The method further includes instructing the tape drive to perform tape cartridge verification on the tape cartridge. The method further includes after completion of the tape cartridge verification, unloading the tape cartridge to its original storage position. The method further includes transmitting verification data of the tape cartridge verification to a database of the tape library system for analysis.

According to another embodiment, a computer system for verification of content of tape cartridges in a tape library system is provided. The computer system include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The computer system further includes program instructions to load the tape cartridge into a tape drive of the tape library, wherein the tape drive is a verification tape drive, in response to expiration of the verification period of a tape cartridge. The computer system further includes program instructions to instruct the tape drive to perform tape cartridge verification on the tape cartridge. The computer system further includes program instructions to unload the tape cartridge to its original storage position after completion of the tape cartridge verification. The computer system further includes program instructions to transmit verification data of the tape cartridge verification to a database of the tape library system for analysis.

According to yet another embodiment, a computer program product for verification of content of tape cartridges in a tape library system is provided. The computer program product may include one or more computer-readable storage devices and program instructions stored on at least one of the one or more tangible storage devices, the program instructions executable by a processor. The computer program product further includes program instructions to load the tape cartridge in a tape drive of the tape cartridge, wherein the tape drive is a verification tape drive, in response to expiration of the verification period of a tape cartridge. The computer program product further includes program instructions to instruct the tape drive to perform tape cartridge verification of the tape cartridge. The computer program product further includes program instructions to unload the tape cartridge to its original storage position after completion of the tape cartridge verification. The computer program product further includes program instructions to transmit verification data of the tape cartridge verification to a database of the tape library system for analysis.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
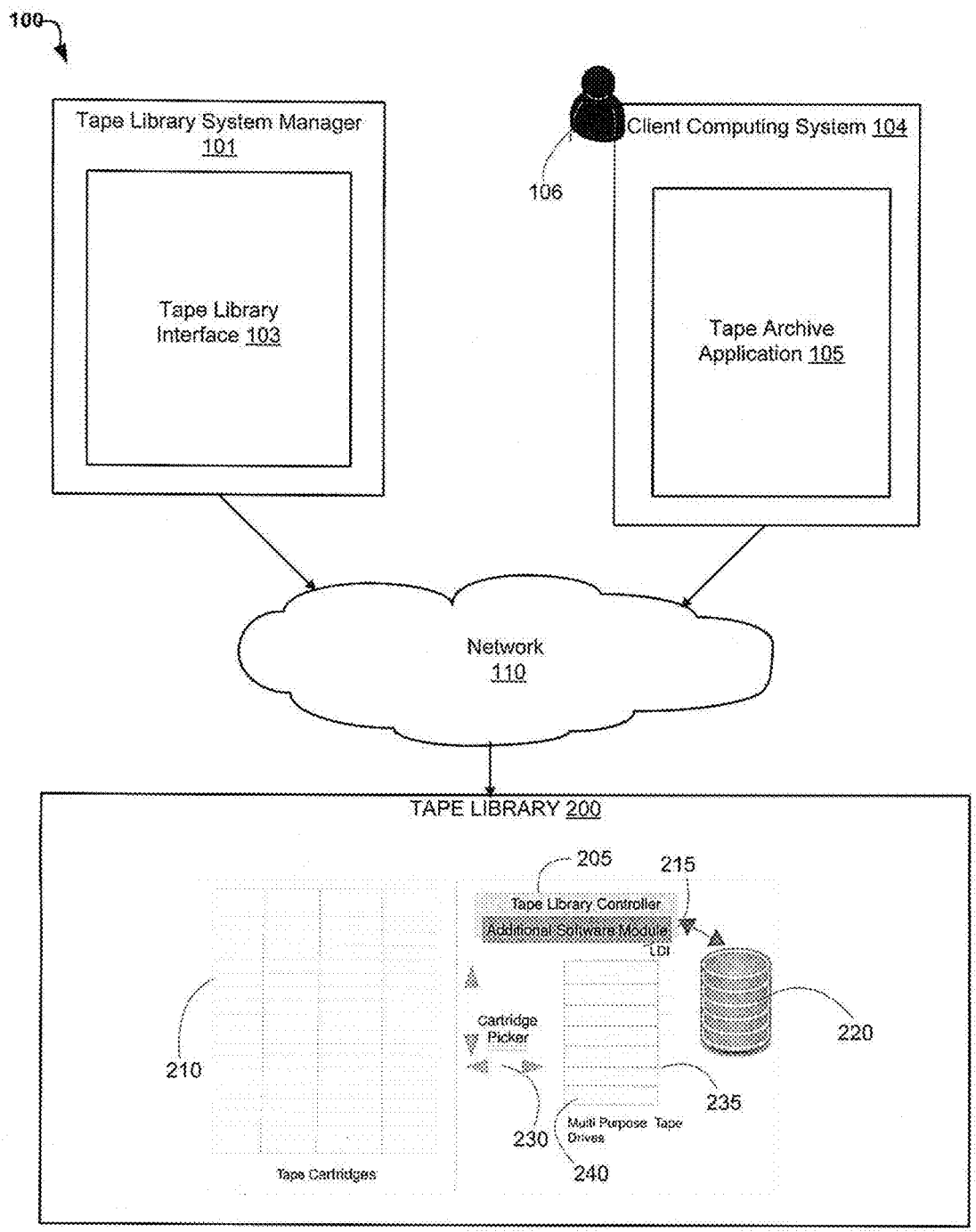
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relates generally to the field of computers, and more particularly to tape library initiation of media verification in data centers. The following described exemplary embodiments provide a system, method and program product to, among other things, for tape library initiation of media verification in data centers. Therefore, at least one embodiment of the present invention have the capacity to improve the technical field of data center facilities used for housing computer systems and associated components, such as telecommunications and storage systems.

Embodiments of the present invention teach a tape library system for performing data integrity of the tape cartridges as background task. Embodiments of the present invention will ensure that the verification is performed periodically at maximal possible transfer speed and it will further ensue that the used resources will be minimized. Typically, tape drives may consist of several communication interfaces used for data transfer (SAS/Fibre), service (TCP/IP) and operating instructions of a library drive interface (LDI). For example, the LDI is used by a tape library of the tape drive to instruct the tape drive to operate a specific operation, like load cartridge, unload cartridge, retrieve inquiry and retrieve statistics data.

However, though state of the art LDI implementations are designed for low data throughput and thus should not be used for large data transfers, the LDI may allow a tape library controller to instruct the tape drive to perform a non-data transfer operation to verify the content of the tape cartridge. After verification is completed, the media specific parameters can be retrieved through the LDI Interface and be stored within the internal database of the library, which can be accessed by the data analysis application. The tape library controller (TLC) provides a configurable interface (WEB/CLI) to observe/change the tape verification period.

Once a verification period for a media is expired, the TLC will load the required media to a tape-drive configured as verification device and will instruct the tape-drive through the LDI interface to perform the media verification. After completion the media will be unloaded and returned to its original storage location. This complete process will not affect the tape library inventory reported to this host application, so that from a host perspective always a consistent status will be reported. If the host Application is requesting data from a tape cartridge which is currently being verified, the verification will be interrupted and the cartridge will be loaded to the specified destination drive for normal data retrieval operation. Another option is to use idle tape drives for the data integrity check. For instance, an external request to use this particular tape drive or to read/write data from/to the tape cartridge which currently is being verified by the Backup/Archive Application will interrupt the verification process and the TLC handles the required step to perform the data transfer to/from the host application. The TLC/LDI is used to perform the verification of the content of the tape cartridges.

The configurable tape library controller determines the verification period, the tape cartridge to be scanned and the tape drive to be used for verification. The verification result is retrieved via the library drive interface and stored within the library internal database which can be accessed by the data analysis application. Idle tape drives can be used for the data integrity check while they are not accessed. These drives are externally reported as regular tape library components and in case they are not in use, they can perform verification tasks.

An incoming request to use one of these tape drives for read or write operations by the backup/archive application will interrupt the running verification process and the TLC handles the required steps to fulfil the requested data exchange from/to the host application. From a host system perspective view the media verification process will be performed hidden as background task. The backup or archive application neither controls nor monitors the media verification process. The tape library inventory data will not report running media verification processes. If a data transfer element or data storage element is requested which is currently used by the background media verification process the response time to fulfil this request may increase. Requests for data retrieval from the host system can interrupt the media verification background process if necessary. In one implementation, the tape library can also be a high-latency media storage system.

Embodiments of the present invention provide a system and method for verification of content of tape cartridges in a tape library system. In response to expiration of the verification period of a tape cartridge, loading the tape cartridge in a tape drive of the tape library, wherein the tape drive is a verification tape drive, instructing the tape drive to perform tape cartridge verification of the tape cartridge, after completion of the tape cartridge verification, unloading the tape cartridge to its original storage position; and transmitting verification data of the tape cartridge verification to a database of the tape library system for analysis.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user computer and partly on a remote computer or entirely on the remote computer or server. In the latter scenario, the remote computer may be connected to the user computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to provide library-initiated media verification. Referring to FIG. 1, an exemplary networked computer environment 100, for tape library initiation of media verification in data centers, according to embodiments, is depicted. The networked computer environment 100 includes tape library system manager 101, client computing system 104 and tape library 200, all interconnected over network 110, according to embodiments. Tape library system manager 101, client computing system 104 and tape library 200 operate over network 110 to facilitate tape library initiation of media verification in data center performance system tape library system for performing data integrity of the tape cartridges as background task and, also, to ensure that the verification is performed periodically at maximal possible transfer speed and it will further ensue that the used resources will be minimized, according to embodiments. Client computing system 104 can be, for example, a laptop, tablet, or notebook personal computer (PC), a desktop computer, a mainframe or mini computer, or a personal digital assistant (PDA). Client computing system 104 can also be any portable device that provides computing, information storage and, computing retrieval capabilities, including, for example, a handheld device, or handheld computer, pocket PC, connected organizer, electronic book (eBook) reader, a personal digital assistant (PDA), a smart phone, or other portable devices. Client computing system 104 includes administrator tape archive application 105. Tape archive application 105 can be any type of software system application that executes program instructions in client computing system 104, according to embodiments.

Tape archive application 105 can also be a client enterprise system application that operates program instructions of the Internet, and other software program applications of client computing system 104, thus providing a comprehensive, and diverse software program execution platform for executing the program instruction in client computing system 104. The software program execution platform can be utilized by tape archive application 105, or by a server program application that operates to request a cartridge or tape drive which are currently used for verification of the tape cartridge, wherein the monitored administrative actions are recorded for tape library initiation of media verification in data centers via tape archive application 105. Tape library system manager 101 can be, for example, a mainframe server computer system such as a management server, a web server, or any other electronic device or computing system capable of receiving and sending data performance verification of recorded user 106, client, or administrative actions of client computing system 104, for facilitating tape library initiation of media verification in data center performance system by tape library system manager 101 for performing data integrity check of the tape cartridges as background task.

Tape library system manager 101 can also represent a "cloud" of computers interconnected by one or more networks, wherein Tape library system manager 101 is a primary server for a computing system utilizing clustered computers when accessed through network 110. Tape library system manager 101 includes a tape library interface 103, a system performance verification tool, which is invoked, either manually, or dynamically to perform system performance verification of client computing system 104, during facilitation of tape library initiation of media verification in data center performance system tape library system manager 101. Tape library interface 103 receives, from tape archive application 105, requests for data from a tape cartridge of tape library which are currently being verified. The tape library interface 103 tape library 200 to instruct tape drives of tape library 200 to operate specific operations, for instance, to load or unload cartridge, retrieve inquiry statistics data of the tape library 200, according to embodiments of the present invention.

As previously mentioned, in general, the tape library interface 103 has a low performance and should not be used for large data transfers but the tape library interface 103 allows tape library controller 205 to instruct the tape library 200 to perform a non data transfer operation to verify the content of a tape cartridge 210. After the verification is completed the media specific parameters can be retrieved through the tape library interface 103 and be stored within the libraries internal database, which can be accessed by data analysis application of tape library interface 103.

Network 101 includes one or more networks of any kind that can provide communication links between various devices and computers connected together within system performance verification system environment 100. Network 101 can also include connections, such as wired communication links, wireless communication links, or fiber optic cables. Network 101 can also be implemented as a number of different types of networks, including, for example, a local area network (LAN), wide area network (WAN) or a packet switched telephone network (PSTN), or some other networked system. System performance verification system environment 100 can utilize the Internet with network 101 representing a worldwide collection of networks. The term "Internet" as used according to embodiments of the present invention refers to a network, or networks that uses certain protocols, such as the TCP/IP protocol, and possibly other protocols such as the hypertext transfer protocol (HTTP) for hypertext markup language (HTML) documents that make up the world wide Web (the web). Tape library is a storage device which contains one or more tape drives, a number of slots to hold tape cartridges, 210 a barcode reader to identify tape cartridges and an automated method for loading tapes. In the depicted embodiments, Tape drive library includes tape cartridges, a database for storing verification policies, verification results, re-verification data, tape drives for providing two different operating modes, tape library controller, tape library internal database, archive/backup application, multi-purpose tape drive with read interrupt able data verification mode, data cartridge slot, library drive interface for command line interface or web based interface and, library accessory, which is responsible for media movement.

As initial step the operator of the tape library 200 has to specify the media verification policy. This policy includes the amount of drives used for the media verification, the verification period, the time frame when the verification should be performed (scheduled), the priority of the verification and read/write mode and an idle time specification defining when the verification can be performed. The configuration can be done through tape library interface 103 of the tape library controller 205, according to embodiments. The additional software package 215 running on the tape library controller 205 is able to monitor the status of the tape drives 240, to execute the media verification regarding the configured policies, to perform media movement operations within the tape library 200 and to change the operating mode of the tape drives 240. According to embodiments, once the media verification has been activated the software module will monitor scheduled verifications. For example, a media verification for cartridge 0001 is expired regarding the defined verification policy. The verification will be scheduled and initiated as soon as next drive is available and the job is active. The tape library controller 205 loads the cartridge 230 to the tape drive 240 available for media verification. The tape library controller 205 further instructs the tape drive 240 to perform the media verification for the loaded cartridge 210. Once the verification is completed the database record 220 for this particular cartridge will be updated, then at step 396, the cartridge 230 is unloaded to his origin storage location and the multi-purpose drive 240 and tape drive's 235 operating mode is switched to normal read/write. If tape archive application 105 running on the client computing system 104 is either requesting a cartridge 230 or tape drive which are currently used for the verification, the tape library controller 205 can interrupt the verification process and full fill the host system request. The left media verification will be rescheduled and can be done by the same drive or any other drive.

Figure 2:
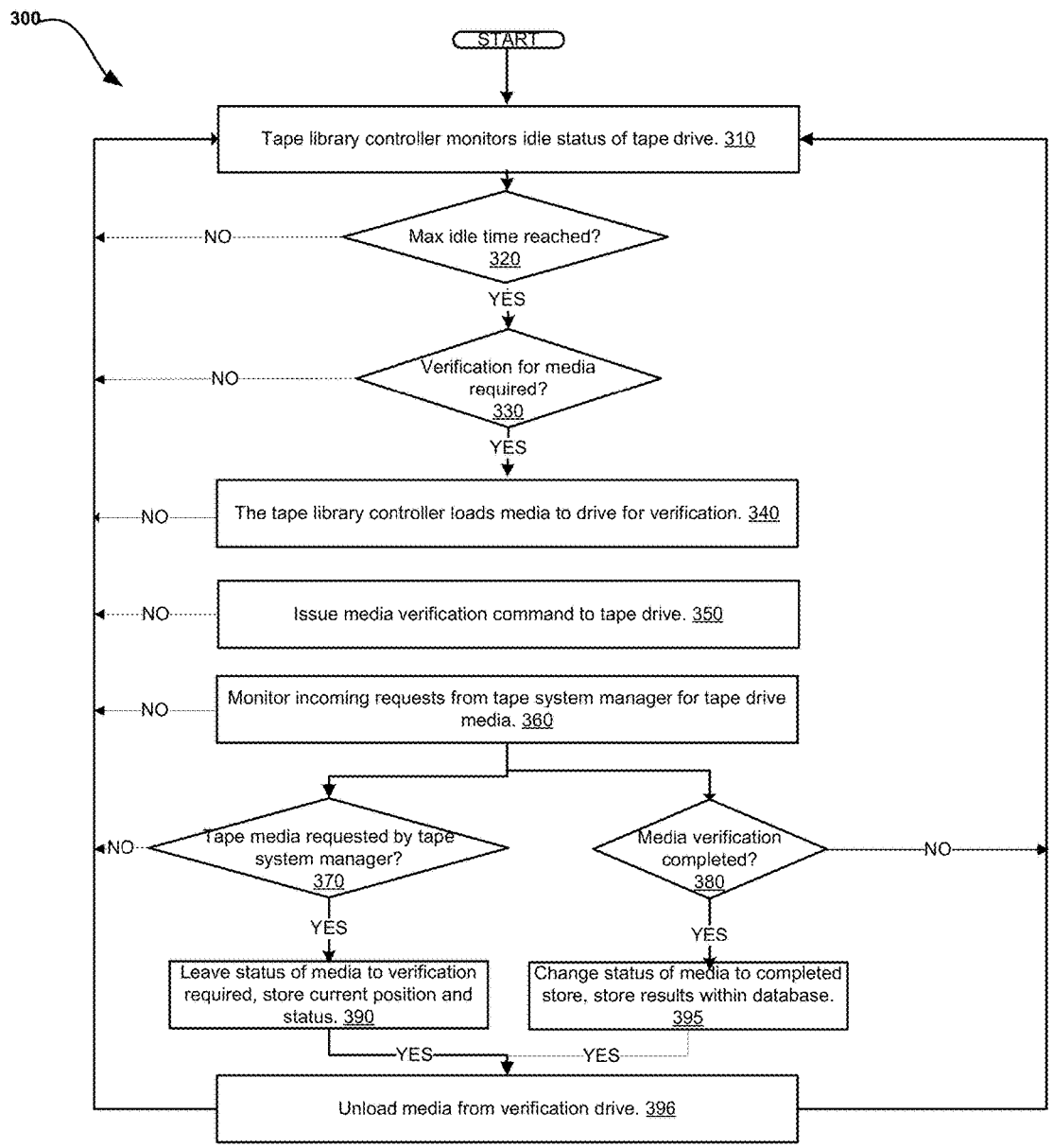
FIG. 2 is an operational flowchart 300 illustrating the steps carried out by a program for facilitating tape library initiation of media verification in data center tape library system for performing data integrity check of the tape cartridges as background task according to at least one embodiment.

FIG. 2 is an operational flowchart 300 illustrating the steps carried out by a program for facilitating tape library initiation of media verification in data center performance system tape library system for performing data integrity of the tape Cartridges as background task. At step 310, tape library controller (FIG. 1) monitors idle status of tape drive. The tape library controller determines if a maximum idle time is reached at decision 320. If the maximum idle time is reached, then, at decision 330, the tape library controller further verifies if media is required at decision 330. However, if the maximum idle time is not reached, then, at step 310, the tape library controller monitors idle status of tape drive, according to embodiments. At step 340, the tape library controller loads media to drive for verification. At step 350, the tape library controller issues media verification command to tape drive.

At step 360, the tape library monitors incoming requests from the tape library manager system for tape drive media. At decision 370, the tape library controller determines whether tape media is requested by the tape library system manager. If the tape media is requested by the tape system manager, at step 390, the tape library controller leaves status of media to verification required. However, if the tape media is not requested by the tape library system manager, then, at step 310, the tape library controller monitors idle status of the tape drive. At decision 380 the tape library controller determines if the media verification is completed. If the media verification is completed, then, at step 395, the tape library controller changes status of media to completed store. However, if the media verification is not completed, at step 310, the tape library controller monitors idle status of the tape drive.

Figure 3:
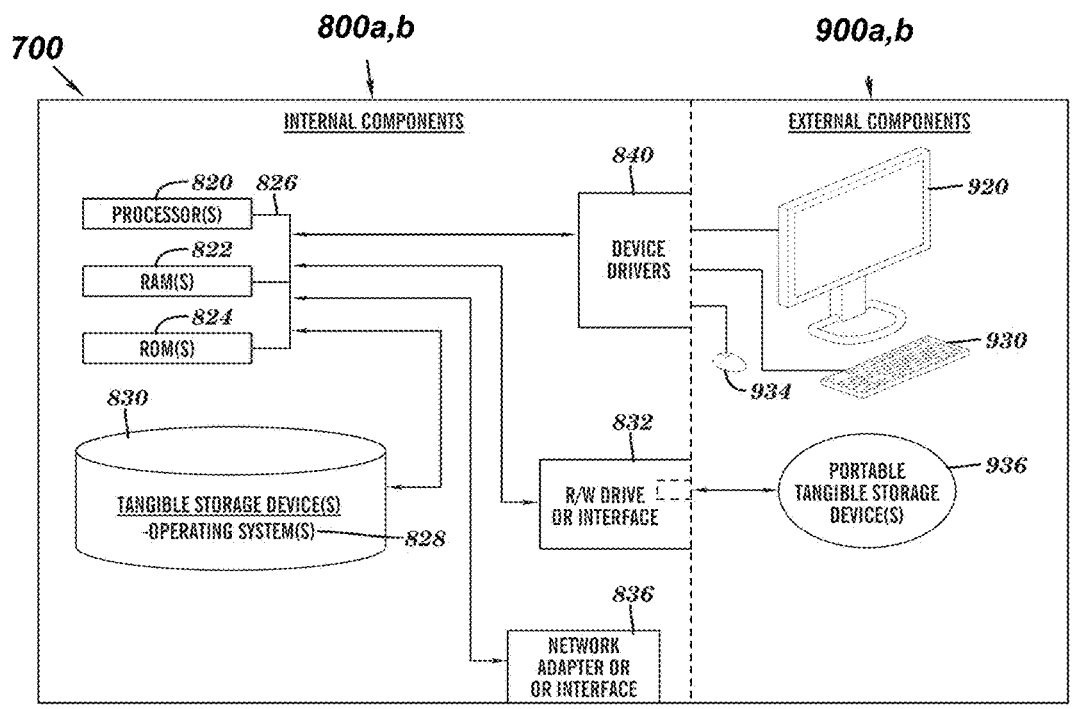
FIG. 3 is a block diagram of internal and external components of computers and servers depicted in FIG. 1 according to at least one embodiment.

FIG. 3 is a block diagram 700 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Client computing device 104 and Tape library 112 (FIG. 1) may include respective sets of internal components 800 *a,b* and external components 900 *a,b* illustrated in FIG. 6. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Tape archive application 105 in client computing device 104 (FIG. 1) and the tape library controller 205 in Tape library 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 *a,b* also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) can be stored on one or more of the respective portable computer-readable tangible storage devices 936, read via the respective R/W drive or interface 832 and loaded into the respective hard drive 830.

Each set of internal components 800 *a,b* also includes network adapters or interfaces 836 such as a TCP/IP adapter cards, wireless Wi-Fi interface cards, or 3G or 4G wireless interface cards or other wired or wireless communication links. The Software Program 108 (FIG. 1) and tape archive application 105 in client computing device 104 (FIG. 1) and the tape library controller 205 in tape library 112 (FIG. 1) can be downloaded to client computing device 104 (FIG. 1) and tape library 112 (FIG. 1) from an external computer via a network (for example, the Internet, a local area network or other, wide area network) and respective network adapters or interfaces 836. From the network adapters or interfaces 836, the Software Program 108 (FIG. 1) and tape archive application 105 in client computing device 104 (FIG. 1) and the tape library controller 205 in Tape library 112 (FIG. 1) (FIG. 1) (FIG. 1) in network server 114 (FIG. 1) are loaded into the respective hard drive 830.

The network may comprise copper wires, optical fibers, wireless transmission, routers, firewalls, switches, gateway computers and/or edge servers. Each of the sets of external components 900 *a,b* can include a computer display monitor 920, a keyboard 930, and a computer mouse 934. External components 900 *a,b* can also include touch screens, virtual keyboards, touch pads, pointing devices, and other human interface devices. Each of the sets of internal components 800 *a,b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
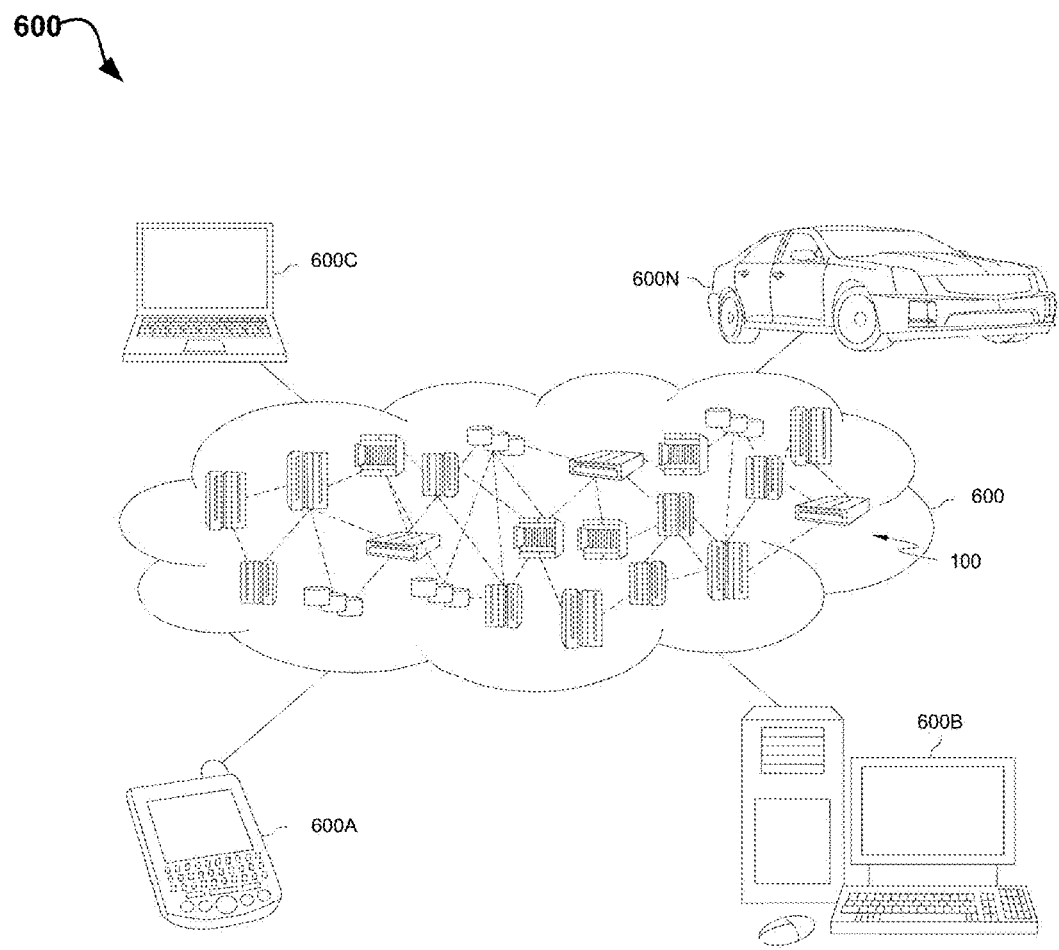
FIG. 4 is a block diagram of an illustrative cloud computing environment including the computer system depicted in FIG. 1, in accordance with an embodiment of the present disclosure.

Referring now to FIG. 4, illustrative cloud computing environment 600 is depicted. As shown, cloud computing environment 600 comprises one or more cloud computing nodes 100 with which local computing devices used by cloud consumers, such as, for example, personal digital assistant (PDA) or cellular telephone 600A, desktop computer 600B, laptop computer 600C, and/or automobile computer system 700N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 600A-N shown in FIG. 7 are intended to be illustrative only and that computing nodes 100 and cloud computing environment 600 can communicate with any type of computerized device over any type of network and/or network addressable connection (e.g., using a web browser).

Figure 5:
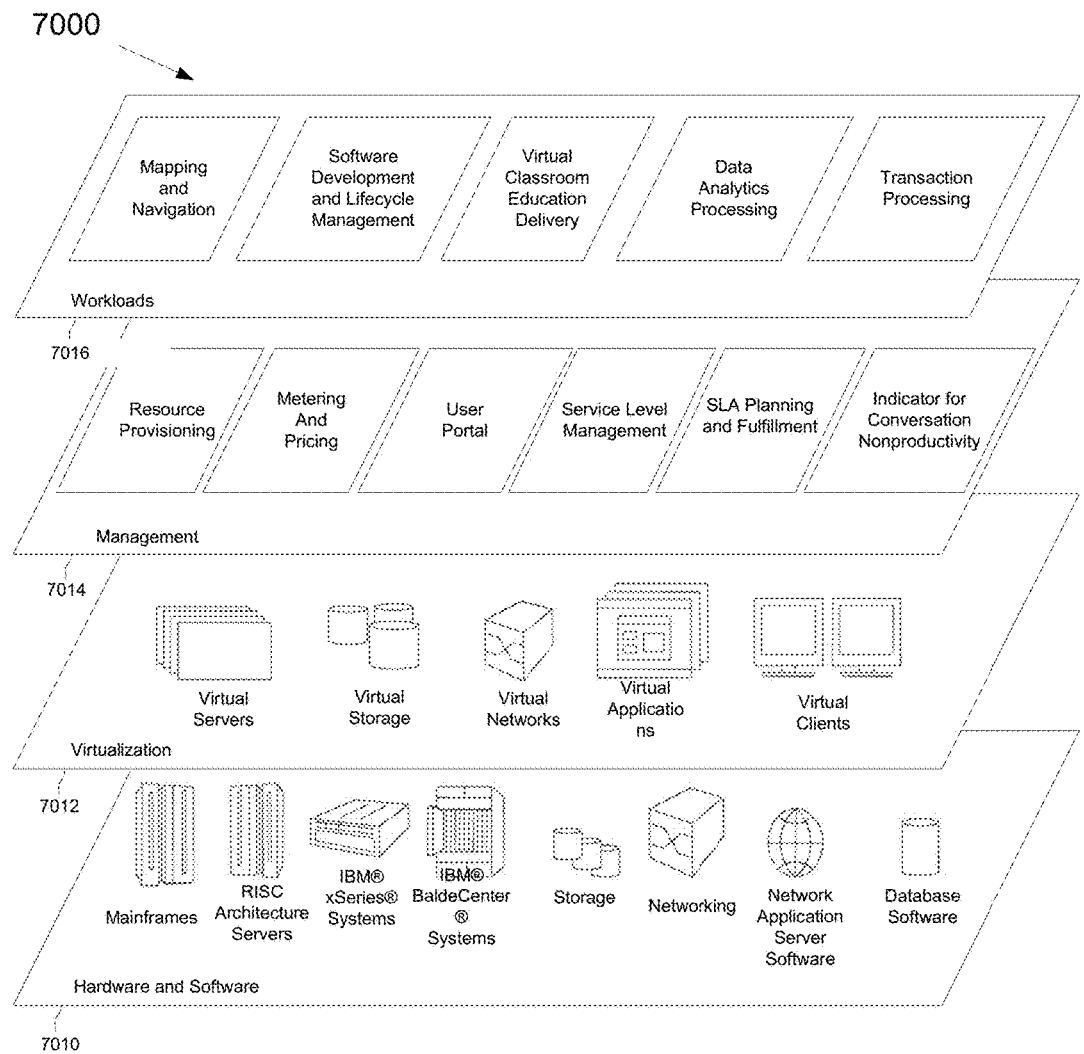
FIG. 5 is a block diagram of functional layers of the illustrative cloud computing environment of FIG. 4, in accordance with an embodiment of the present disclosure.

Referring now to FIG. 5, a set of functional abstraction layers 7000 provided by cloud computing environment 7000 (FIG. 5) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 7010 includes hardware and software components. Examples of hardware components include: mainframes; RISC (Reduced Instruction Set Computer) architecture based servers; storage devices; networks and networking components. In some embodiments, software components include network application server software.

Virtualization layer 7012 provides an abstraction layer from which the following examples of virtual entities may be provided: virtual servers; virtual storage; virtual networks, including virtual private networks; virtual applications and operating systems; and virtual clients.

In one example, management layer 7014 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User 106 portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. Workloads layer 7016 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for verification of content of tape cartridges in a tape library system, the method comprising: in response to expiration of verification period of a tape cartridge, loading the tape cartridge in a tape drive of the tape library, wherein the tape drive is a verification tape drive; instructing the tape drive to perform tape cartridge verification of the tape cartridge, wherein the tape cartridge verification of the tape cartridge is performed as a background task; monitoring incoming requests for access to the tape cartridge being verified from a host system, wherein verification of the tape cartridge is interrupted when there is an incoming request to access the tape cartridge and the tape cartridge is loaded to a destination drive specified by the host system for normal data retrieval operation; after completion of the tape cartridge verification, unloading the tape cartridge to its original storage position; and transmitting verification data of the tape cartridge verification to a database of the tape library system for analysis;

wherein, the tape library system switches at least two operation modes based on verification policies of the tape library system, and the verification policy includes performance of duration of verification, priority definition between verification task and normal read, write operations.

2. The method according to claim 1, wherein, the tape drive supports at least two operation modes.

3. The method according to claim 2, wherein, at least one of the at least two operation modes supports normal read write operation.

4. The method according to claim 2, wherein, at least one of the at least two operation modes supports verification operation.

5. The method according to claim 1, further comprising the step of: monitoring incoming requests for verification of content of tape cartridges from a host system.

6. A computer system for verification of content of tape cartridges in a tape library system, the computer system comprising: one or more processors, one or more computer-readable memories, one or more computer-readable tangible storage devices and program instructions which are stored on at least one of the one or more storage devices for execution by at least one of the one or more processors via at least one of the one or more memories, the program instructions comprising: program instructions to load the tape cartridge in a tape drive of the tape cartridge, wherein the tape drive is a verification tape drive in response to expiration of verification period of a tape cartridge; program instructions to instruct the tape drive to perform tape cartridge verification the tape cartridge, wherein the tape cartridge verification of the tape cartridge is performed as a background task; program instruction to monitor incoming requests for access to the tape cartridge being verified from a host system, wherein verification of the tape cartridge is interrupted when there is an incoming request to access the tape cartridge and the tape cartridge is loaded to a destination drive specified by the host system for normal data retrieval operation; program instructions to unload the tape cartridge to its original storage position after completion of the tape cartridge verification; and program instructions to transmit verification data of the tape cartridge verification to a database of the tape library system for analysis;

wherein, the tape library system switches at least two operation modes based on verification policies of the tape library system, and the verification policy includes performance of duration of verification, priority definition between verification task and normal read, write operations.

7. The computer system according to claim 6, wherein, the tape drive supports at least two operation modes.

8. The computer system according to claim 7, wherein, at least one of the at least two operation modes supports normal read write operation.

9. The computer system according to claim 7, wherein, at least one of the at least two operation modes supports verification operation.

10. The computer system according to claim 6, further comprising the step of: monitoring incoming requests for verification of content of tape cartridges from a host system.

11. A computer program product for verification of content of tape cartridges in a tape library system, the computer program product comprising: one or more non-transitory computer-readable tangible storage devices and program instructions stored on at least one of the one or more storage devices, the program instructions comprising: program instructions to load the tape cartridge in a tape drive of the tape library, wherein the tape drive is a verification tape drive, in response to expiration of verification period of a tape cartridge; program instructions to instruct the tape drive to perform tape cartridge verification of the tape cartridge, wherein the tape cartridge verification of the tape cartridge is performed as a background task; program instruction to monitor incoming requests for access to the tape cartridge being verified from a host system, wherein verification of the tape cartridge is interrupted when there is an incoming request to access the tape cartridge and the tape cartridge is loaded to a destination drive specified by the host system for normal data retrieval operation; program instructions to unload the tape cartridge to its original storage position after completion of the tape cartridge verification; and program instructions to transmit verification data of the tape cartridge verification to a database of the tape library system for analysis;

wherein, the tape library system switches at least two operation modes based on verification policies of the tape library system, and the verification policy includes performance of duration of verification, priority definition between verification task and normal read, write operations.

12. The computer program product according to claim 11, wherein, the tape drive supports at least two operation modes.

13. The computer program product according to claim 12, wherein, at least one of the at least two operation modes supports normal read/write operation.

14. The computer program product according to claim 12, wherein, at least one of the at least two operation modes supports verification operation.

* * * * *